Nov. 15, 1966     L. SOKOL     3,285,092
STEERING KNOB
Filed Nov. 12, 1963
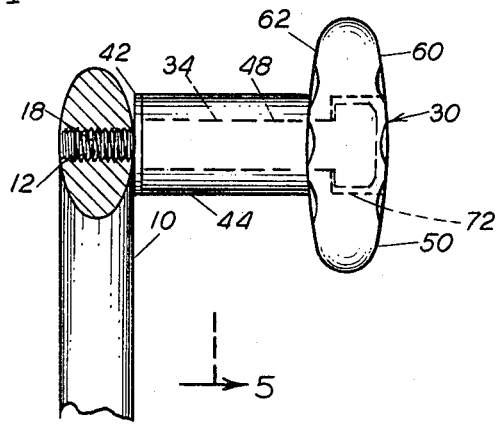
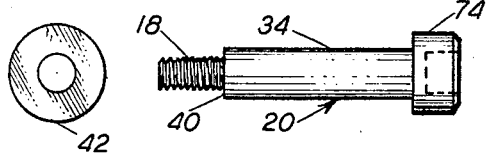
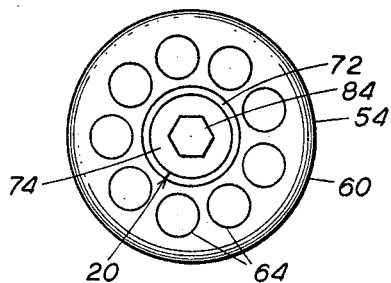
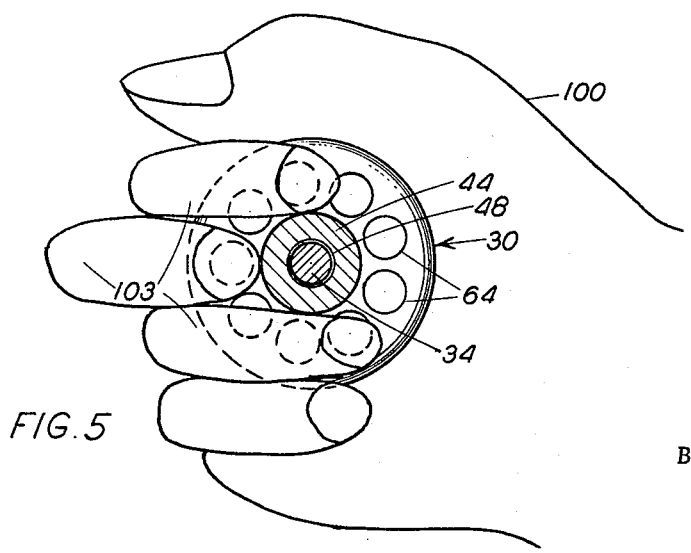
INVENTOR.
LEO SOKOL
BY

United States Patent Office 3,285,092
Patented Nov. 15, 1966

3,285,092
STEERING KNOB
Leo Sokol, Duncan, Nebr.
Filed Nov. 12, 1963, Ser. No. 322,698
2 Claims. (Cl. 74—557)

This invention relates to steering knobs of the kind commonly attached to the steering wheels of tractors and other vehicles and more particularly it is an object of this invention to provide a steering knob which is more comfortable to use than knobs of the prior art.

Heretofore steering knobs have conventionally had enlarged outer ends which feel uncomfortably hot in the hand of an operator using such a knob over a long period of time.

A further object is therefore to provide a steering knob, the outer end of which is more cool and pleasant to hold in the hand during long hours of work, because it is provided with ventilation openings therethrough, allowing air to pass through the enlarged end of the knob to conduct away heat coming from the operator's hand.

Still another object of the invention is to provide a steering knob which can be more easily and firmly gripped and more effectively held because the walls of openings through the enlarged end of the knob are adapted to be engaged by finger tip and palm portions of the operator's hand, whereby the hand engages a relatively rougher surface which is less slippery than the conventional smooth surfaced knob.

An important object is to provide a steering knob having a low cost of construction.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawings:

FIGURE 1 is a side elevation of a steering knob of this invention shown as attached to a portion of a steering wheel, with parts of the knob assembly being shown in dotted lines.

FIGURE 2 is a right hand view of the knob of FIGURE 1 as it would be seen from the right hand side thereof in FIGURE 1.

FIGURE 3 is a detail showing the securing bolt of the invention.

FIGURE 4 shows a washer portion of the assembly.

FIGURE 5 is a sectional view taken along the line 5—5 of FIGURE 1, but with the hand of an operator shown gripping the enlarged end of the knob in the palm of the hand.

Referring to the drawings for a more particular description, a portion of a steering wheel is shown in FIGURE 1 at 10, having a horizontally extending threaded opening 12 disposed therethrough for receiving the threaded end 18 of a bolt 20 of this invention, the invention itself being a steering knob generally indicated at 30 in FIGURE 1.

The bolt 20 is provided with a central section or shank 34, which latter is of greater diameter than the threaded terminal end section 18 for providing the bolt with a transverse, annular shoulder 40, which latter is adapted to engage one side of a washer 42 normally disposed between the shoulder 40 and the steering wheel 10 and around the smaller threaded terminal end section 18, in order to facilitate rotation of the knob 30 with respect to the steering wheel 10.

The knob 30 has an inner portion 44, which latter has a cylindrical opening extending horizontally therethrough as seen at 48 in dotted lines in FIGURE 1.

On an outer end of the shank portion 44 an enlarged section 50 is provided which can be called the hand grip section 50, the hand grip section 50 being larger in size, as seen in the direction extending axially of the bolt 20 than the shank portion 44, in a manner common for knobs used for steering vehicles.

The hand grip portion 50 is rigidly attached to and preferably integral with the shank portion 44.

The hand grip section 50 is preferably circular in shape as seen while looking at it horizontally, having an outer peripheral section 54, which is curved downwardly, inwardly and then upwardly from its rearward side 60 to its forward side 62.

In accordance with this invention the hand grip portion 50 is provided with a plurality of horizontally extending spaced openings 64 therethrough, preferably disposed in parallelism with the shank 34, or, expressed in another way, the openings 64 are preferably provided with walls which are approximately cylindrical in shape.

On its rearward side 60 the hand grip portion 50 is provided with a centrally disposed recess 72, which latter is adapted to rotatably receive the head section 74 of the bolt 20 and the bolt head 74 is preferably provided with a polygonal or otherwise non-round recess 84 extending inwardly from the rearward end thereof, the recess 84 being for the purpose of receiving a tool for rotating the bolt 20 during installation of the threaded section 18 thereof into the handle 10.

The hand grip portion of the knob 50 is of generally conventional shape, except that it is provided with the ventilation openings 64 therethrough.

In operation, and as best seen in FIGURE 5, the hand of an operator is shown at 100 and the palm of his hand is adapted to engage the rearward side 60 of the hand grip portion 50 and certain fingers 103 are adapted to engage the walls of the openings 64 at the forward side 62 of the hand grip portion 50.

The openings 64 thereby provide the knob with a certain roughness which makes it easier to firmly grip and therefore less slippery when the operator's hand is sweaty from hard work.

The openings 64 will be seen to permit air to circulate into the interior of the hand grip portion 50 of the knob for allowing the hand grip portion 50 to cool, whereby the heat of the hand is conducted away from the knob 30 by air circulating in the openings 64.

This invention is believed to have fulfilled the objectives above set forth and to have provided a superior, more comfortable, more cool and more easily gripped steering knob.

From the foregoing description, it is thought to be obvious that a steering knob constructed in accordance with my invention is particularly well adapted for use, by reason of the convenience and facility with which it may be assembled and operated, and it will also be obvious that my invention can be changed and modified without departing from the principles and spirit thereof, and for this reason, I do not wish to be understood as limiting myself to the precise arrangement and formation of the several parts herein shown in carrying out my invention in practice, except as claimed.

I claim:

1. A steering knob for a vehicle having a hand grip portion and means for attaching said hand grip portion to a vehicle steering wheel, said attaching means comprising a knob axle, and means provided in the remainder of said knob and surrounding said knob axle for rotatably receiving said knob axle for rotation of said hand grip portion around said axle, said hand grip portion being further characterized as being for long continuous manual use periods by having exterior outer peripheral portions which are sufficiently smooth and convexly curved as to be comfortable to an operator's hand during steering, said hand grip portion having an annular outer section projecting outwardly away from said axis a greater distance than the remaining portions of said knob, the peripheral edge portions of said projecting section being of progressively greater thickness inwardly of the periphery thereof for comfort in long manual use periods, said annular projecting section of said knob having a plurality of ventilation openings therethrough from the forward to the rearward side thereof, said openings being of a size and number sufficient for substantially assisting the cooling of said hand grip portion by means of circulation of air into said openings for conducting heat away from the wall surfaces of said openings, the thickness of said projecting portion of said hand grip as measured in a direction parallel to said axis being substantially uniform in substantial portions on all sides of each knob opening with the exception of the said peripheral edge portions.

2. The combination of claim 1 in which said openings are specifically a plurality of openings extending throughout said hand grip portion for providing a maximum of open area.

References Cited by the Examiner

UNITED STATES PATENTS

| | | | |
|---|---|---|---|
| Re. 19,509 | 3/1935 | Webb | 74—557 |
| 1,080,080 | 12/1913 | Sessions | 74—552 X |
| 1,218,753 | 3/1917 | Forg | 74—552 X |
| 1,522,879 | 1/1925 | Gregory | 74—557 |
| 1,568,737 | 1/1926 | Isensee | 74—557 |
| 2,222,121 | 11/1940 | Roberts. | |
| 3,149,501 | 9/1964 | Keir | 74—552 |

FRED C. MATTERN, JR., *Primary Examiner.*

BROUGHTON G. DURHAM, *Examiner.*

C. F. GREEN, *Assistant Examiner.*